(12) United States Patent
Kawamura

(10) Patent No.: US 6,185,270 B1
(45) Date of Patent: Feb. 6, 2001

(54) SOLID STATE IMAGING DEVICE AND METHOD FOR DRIVING THE SAME

(75) Inventor: Toshihiro Kawamura, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/129,893

(22) Filed: Aug. 6, 1998

(30) Foreign Application Priority Data

Aug. 7, 1997 (JP) .................................................. 9-212783

(51) Int. Cl.[7] .......................... G11C 19/28; H01L 27/148; H01L 29/768
(52) U.S. Cl. ............................. 377/61; 257/233; 257/241; 257/250
(58) Field of Search ................... 257/231–233, 257/241, 250; 377/61

(56) References Cited

U.S. PATENT DOCUMENTS

| | | | |
|---|---|---|---|
| 4,211,936 | * 7/1980 | Kosonocky et al. | 257/241 |
| 4,803,710 | * 2/1989 | Elabd | 257/232 |
| 5,393,997 | * 2/1995 | Fukusho et al. | 257/233 |

FOREIGN PATENT DOCUMENTS

| | | |
|---|---|---|
| 3806034 A1 | 12/1988 | (DE). |
| 0 346 102 A2 | 12/1989 | (EP). |
| 0 712 238 A1 | 5/1996 | (EP). |
| 0 746 144 A2 | 12/1996 | (EP). |
| 0 771 104 A2 | 5/1997 | (EP). |
| 59-84575 | 5/1984 | (JP). |
| 1-49382 | 2/1989 | (JP). |
| 64-49382 | 2/1989 | (JP). |

OTHER PUBLICATIONS

European Search Report dated Mar. 23, 2000.

* cited by examiner

*Primary Examiner*—Gene M. Munson
(74) *Attorney, Agent, or Firm*—McGinn & Gibb, P.C.

(57) ABSTRACT

In a connection part of vertical transfer registers with respect to a horizontal transfer register, transfer electrodes to which clocks φV1, φV2A, φV3A, φV2B, φV3B, and φV1A are applied are arranged in the cited order. In a horizontal transfer register 6, transfer is conducted by 3-phase clocks φH1A, ØH1B, and φH2. By activating clocks, signal charges of a channel denoted by A-A' and channels equivalent thereto are first transferred to undersides of electrodes of φH1A of the horizontal transfer register. The signal charges are transferred in the rightward direction to underside of electrodes of φH1B. Subsequently, signal charges of a channel denoted by B-B' and channels equivalent thereto are transferred to undersides of electrodes of φH1B of the horizontal transfer register, and mixed with the signal charges previously transferred. As a result, it becomes possible to reduce pixels and lower the resolution without conducting high speed driving.

8 Claims, 14 Drawing Sheets

TIMING CHART

VERTICAL TRANSFER REGISTER CHARGE TRANSFER DIAGRAM

HORIZONTAL TRANSFER REGISTER CHARGE TRANSFER DIAGRAM

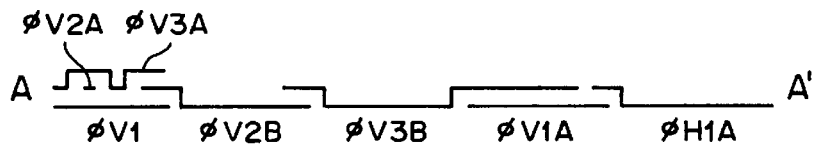
FIG. 10A
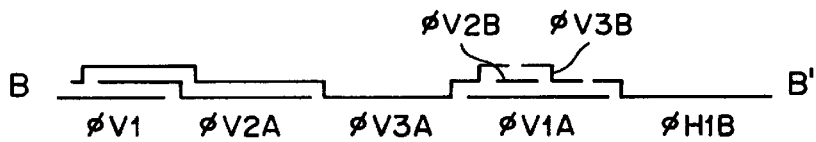
FIG. 10B
FIG. 11
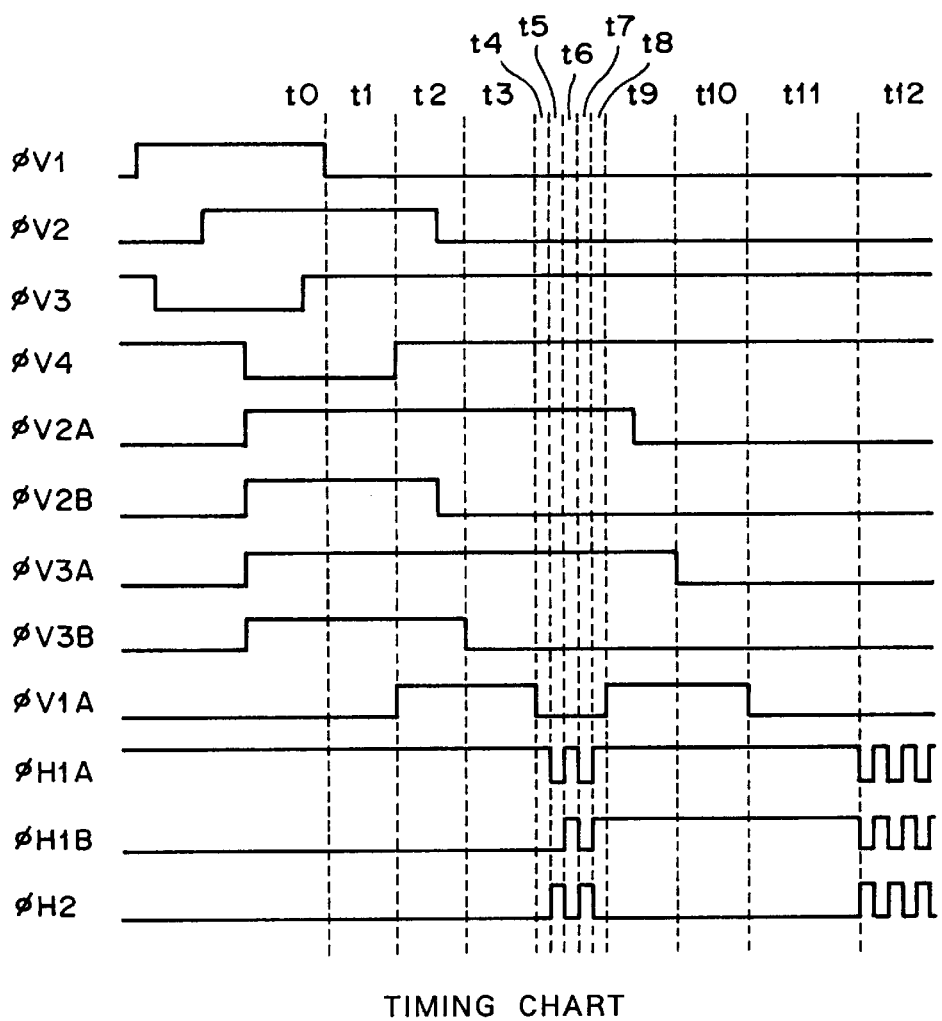
TIMING CHART

FIG. 12
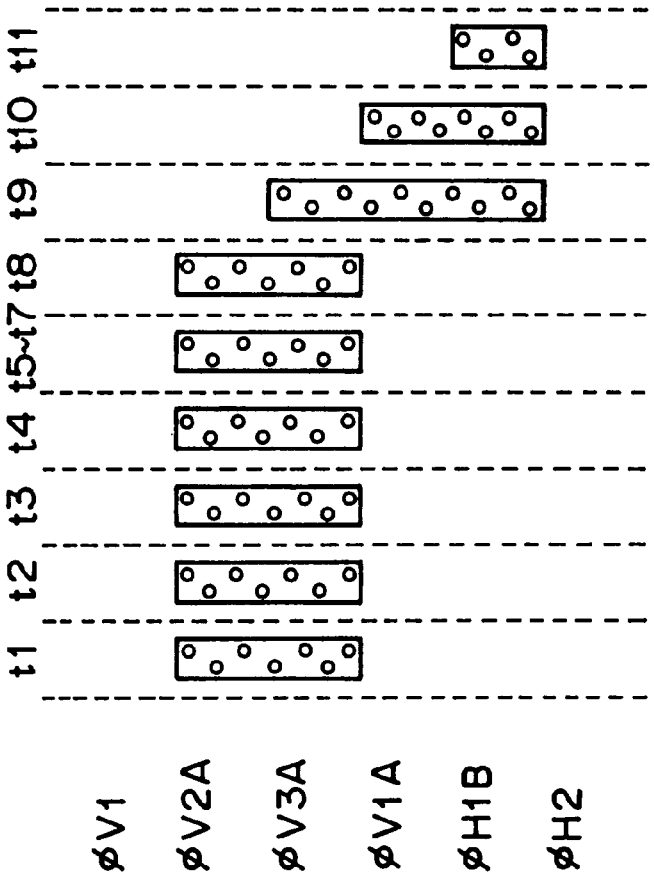
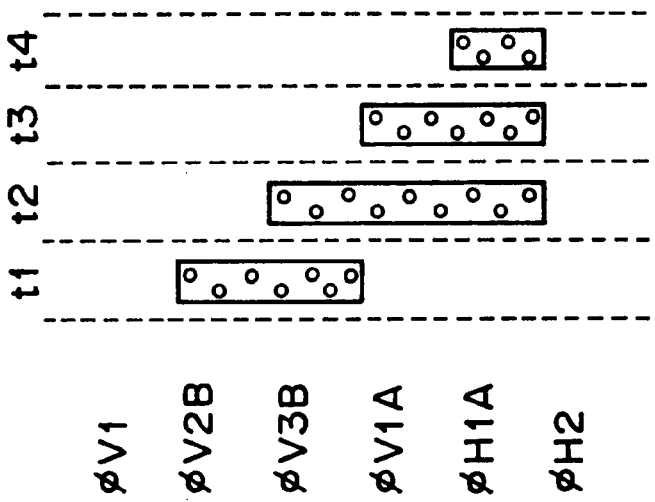
VERTICAL TRANSFER REGISTER CHARGE TRANSFER DIAGRAM

HORIZONTAL TRANSFER REGISTER CHARGE TRANSFER DIAGRAM

TIMING CHART

HORIZONTAL TRANSFER REGISTER CHARGE TRANSFER DIAGRAM

SOLID STATE IMAGING DEVICE AND METHOD FOR DRIVING THE SAME

BACKGROUND OF THE INVENTION

1. Field of the Invention

The present invention relates to a solid state imaging device of all pixel simultaneous read type in which signal charges of unit pixels are read out into a vertical transfer register simultaneously and independently, and relates to a method for driving such a solid state imaging device. In particular, the present invention relates to a solid state imaging device formed so that signal charges arranged in the horizontal direction may be reduced, and relates to a method for driving such a solid state imaging device.

2. Description of the Related Art

In recent years, it has been demanded to make it possible to display moving pictures on a monitor of a personal computer as well. In the current processing capability, however, it is difficult to display moving pictures on personal computers with a resolution close to that of television sets. For displaying image data taken in from, for example, a CCD camera, it is necessary to reduce frames and lower the frame rate, or maintain the frame rate and reduce image data. In the case where the frame rate has been lowered, however, smooth motions cannot be represented. Typically, therefore, pixels are reduced, i.e., the resolution is lowered. As for the conventional image change-over method, there was a method of simultaneously reading signal charges of all photodiodes and then reducing in a solid state imaging device, and a method of coping with it by using software processing on the personal computer. Prior to describing the conventional image change-over method, the conventional solid state imaging device will first be described.

FIG. 1 is a schematic top view showing the entire configuration of a conventional solid state imaging device of all pixel readout type. As shown in FIG. 1, the conventional solid state imaging device is formed by photodiodes 1 arranged in a matrix form to convert light to signal charges, optical black level regions 2 for forming a reference level of image signals, a vertical surplus charge sweeping out drain 3 and a horizontal surplus charge sweeping out drain 4 for sweeping away the surplus charge, vertical transfer registers 5 for reading out and transferring signal charges stored in the photodiodes 1, and a horizontal transfer register 6 for receiving the signal charges transferred through a vertical transfer register 5 and transferring the signal charges to an output amplifier 7. On the photodiodes 1, RGB filters are arranged by using, for example, the Bayer method.

FIGS. 2 and 3 are diagrams showing an electrode configuration of a connection part between the vertical transfer registers 5 and the horizontal transfer register 6 shown in FIG. 1. FIG. 2 is a top view. FIG. 3 is a sectional view along a line A-A' of FIG. 2. The vertical transfer registers 5 are driven by 4-phase clocks $\phi V1$, $\phi V2$, $\phi V3$, and $\phi V4$. Transfer electrodes to which the clock $\phi V1$ is applied are formed by first polysilicon layer. Transfer electrodes to which the clocks $\phi V2$ and $\phi V4$ are applied are formed by second polysilicon layer. Transfer electrodes to which the clock $\phi V3$ is applied are formed by third polysilicon layer. Transfer electrodes of a final stage to which $\phi V1$ is applied form gates for the horizontal transfer register 6.

The horizontal transfer register 6 is driven by 2-phase clocks $\phi H1$ and $\phi H2$. Each of all transfer electrodes of the horizontal transfer register 6 is formed by the second polysilicon layer and the third polysilicon layer. An electrode portion of the second polysilicon layer forms a storage portion, and an electrode portion of the third polysilicon layer forms a barrier portion. The signal charge of a vertical transfer register is transferred to the horizontal transfer register in such a state that the clock $\phi H1$ of the horizontal transfer register is kept at its high level. In other words, if $\phi V1$ turns the high level in such a state that $\phi H1$ is kept at its high level, then transfer of the signal charge to undersides of the transfer electrodes to which $\phi H1$ has been applied is started. When $\phi V1$ has become its low level, the transfer is completed.

Operation of the conventional solid state imaging device in the connection part between the vertical transfer registers 5 and the horizontal transfer register 6 will now be described by referring to FIGS. 4 to 6. FIG. 4 shows the pulse timing of the 4-phase clocks $\phi V1$, $\phi V2$, $\phi V3$, and $\phi V4$ applied to the transfer electrodes of the vertical transfer registers 5 and the 2-phase clocks $\phi H1$ and $\phi H2$ applied to the transfer electrodes of the horizontal transfer register 6. FIG. 5 shows how signal charge in a vertical transfer register 5 is transferred to the horizontal transfer register 6. FIG. 6 shows how signal charge in the horizontal transfer register 6 is transferred. Signal charges stored under the transfer electrodes to which $\phi V3$ and $\phi V4$ have been applied during t0 begin to be transferred to the undersides of transfer electrodes to which $\phi H1$ is applied, when $\phi V1$ becomes its high level during t1. If $\phi V3$, $\phi V4$, and $\phi V1$ are changed to the low level in the cited order, signal charges are transferred to the undersides of the electrodes for $\phi H1$. The signal charges stored under the electrodes for $\phi H1$ are successively transferred in the horizontal transfer register by repetition of alternate high/low levels of $\phi H1$ and $\phi H2$.

At this time, signals R1, G1, R2, G2, R3, G3, R4 and G4 according to the RGB Bayer arrangement are transferred without destroying the order as shown in FIG. 6. An output waveform of an output amplifier 7 is shown in FIG. 7.

For implementing moving pictures with smooth motions on a personal computer monitor, it is necessary to reduce pixels and lower the image resolution as described above. As for methods for lowering the resolution, there are a method of temporarily recording image data in an external memory, then rearranging data so that filter pixels of the same color will adjoin each other, and treating adjoining data of the same color as one pixel, and a method of reducing one of adjoining data of the same color.

Means for lowering the resolution in the device itself will now be described. For example, in the case where the horizontal resolution is to be reduced to ½, there is used a method of, for example, leaving the center of the image and sweeping away half of the image located on the left and right sides as shown in FIG. 8. Every horizontal line, in this method, a first ¼ portion is transferred at a speed twice the normal speed as a sweeping away region 9, and the data are passed through the output amplifier and then thrown away. The next central ½ portion is transferred at the normal speed as an effective region 8, and image data are obtained. A final ¼ portion is transferred at a high speed in the same way as the first ¼ portion and then thrown away.

In the above described conventional method of lowering the resolution of the horizontal direction by software means, it is necessary to record images temporarily in the external memory and then rearrange data at high speed. In the case where the processing speed of the apparatus cannot cope with this, therefore, the frame rate cannot be maintained consequently, resulting in a drawback.

Furthermore, in the case where the resolution is lowered in the device itself, it is necessary to transfer the ½ image data to be swept away, with high speed drive. Therefore, excessive performance is required of the device, resulting in a lowered yield. In addition, the power dissipation of the drive circuit becomes large. This results in a drawback of degraded performance when viewed as the apparatus.

SUMMARY OF THE INVENTION

An object of the present invention is to provide a solid state imaging device capable of lowering the resolution within a device without requiring high speed drive.

In order to solve the above described problems, the present invention provides a solid state imaging device including a plurality of photodiodes arranged in a matrix form, first kind of vertical transfer registers and second kind of vertical transfer registers disposed alternately so as to be adjacent to the plurality of photodiodes, and a horizontal transfer register for transferring signal charges transferred from the vertical transfer registers to an output amplifier, wherein in a connection part of the vertical transfer registers with respect to the horizontal transfer register, facing the horizontal transfer register, a first transfer electrode of first layer, a first transfer electrode of second layer, a first transfer electrode of third layer, a second transfer electrode of second layer, a second transfer electrode of third layer, and a second transfer electrode of first layer are disposed nearly in the cited order, and wherein the first transfer electrode of second layer and the first transfer electrode of third layer are disposed, in the first kind of vertical transfer registers, on transfer electrodes of layers lower than itself, and the second transfer electrode of second layer and the second transfer electrode of third layer are disposed, in the second kind of vertical transfer registers, on transfer electrodes of layers lower than itself.

Furthermore, the present invention provides a method for driving a solid state imaging device including a plurality of photodiodes arranged in a matrix form, first kind of vertical transfer registers and second kind of vertical transfer registers disposed so as to be adjacent to the plurality of photodiodes, and a horizontal transfer register for transferring signal charges transferred from the vertical transfer registers to an output amplifier. Said method including the step of transferring the signal charges of the vertical transfer registers to the horizontal transfer register. Said step of transferring the signal charges has steps of transferring the signal charges of the first kind of vertical transfer registers to the horizontal transfer register in such a state as to pin the signal charges of the second kind of vertical transfer registers; and thereafter transferring only the signal charges of the second kind of vertical transfer registers to the horizontal transfer register.

In the present invention as heretofore described, in the connection part of the vertical transfer registers with respect to the horizontal transfer register, other signal charges are previously transferred to the horizontal transfer register while a part of signal charges is being pinned, and thereafter remaining signal charges are transferred to the horizontal transfer register. In the horizontal transfer register, therefore, a part of signal charges may be added other signal charges or may be swept out. In the present invention, therefore, it becomes possible to decrease the number of pixels in the horizontal direction. Without requiring high speed driving, it becomes possible in the solid state imaging device to lower the resolution.

In an embodiment in which the signal charges are added in the horizontal transfer register, the signal charge is increased to at least twice after the resolution change-over has been conducted. Therefore, the sensitivity and saturation output can be significantly improved. If an electronic shutter is used together, however, a resolution change-over can be conducted without changing the sensitivity and dynamic range. Furthermore, in an embodiment using a horizontal overflow drain gate, a resolution change-over can be conducted without changing the sensitivity.

BRIEF DESCRIPTION OF THE DRAWINGS

FIG. 10A is a sectional view seen along a line A-A' of FIG. 9;

FIG. 10B is a sectional view seen along a line B-B' of FIG. 9;

FIG. 11 is a timing diagram of drive pulses in the first embodiment of the present invention;

FIG. 12 is a schematic diagram showing the transfer state of signal charge from a vertical transfer register to a horizontal transfer register in the first embodiment of the present invention;

DESCRIPTION OF THE PREFERRED EMBODIMENTS

Hereafter, preferred embodiments of the present invention will be described by referring to accompanying drawing.

Figure 1:
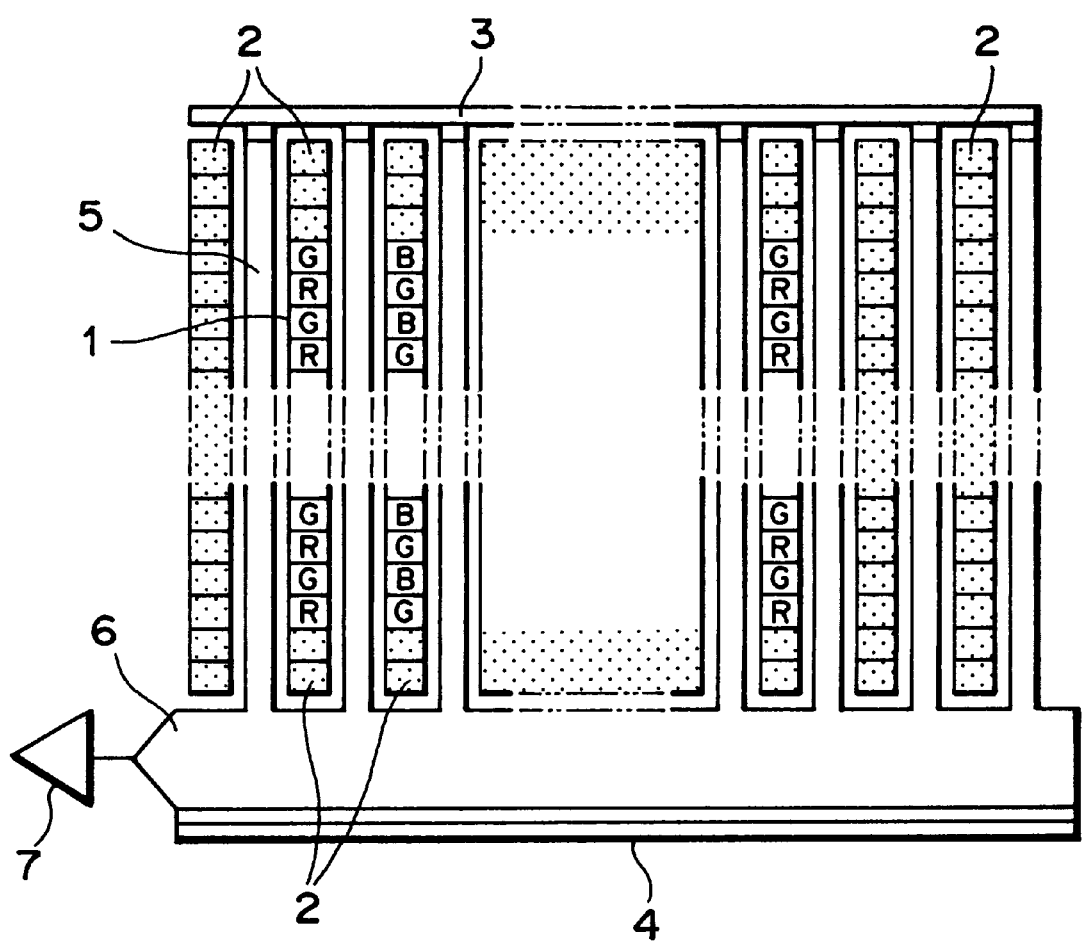
FIG. 1 is a top view of a conventional solid state imaging device.
Figure 2:
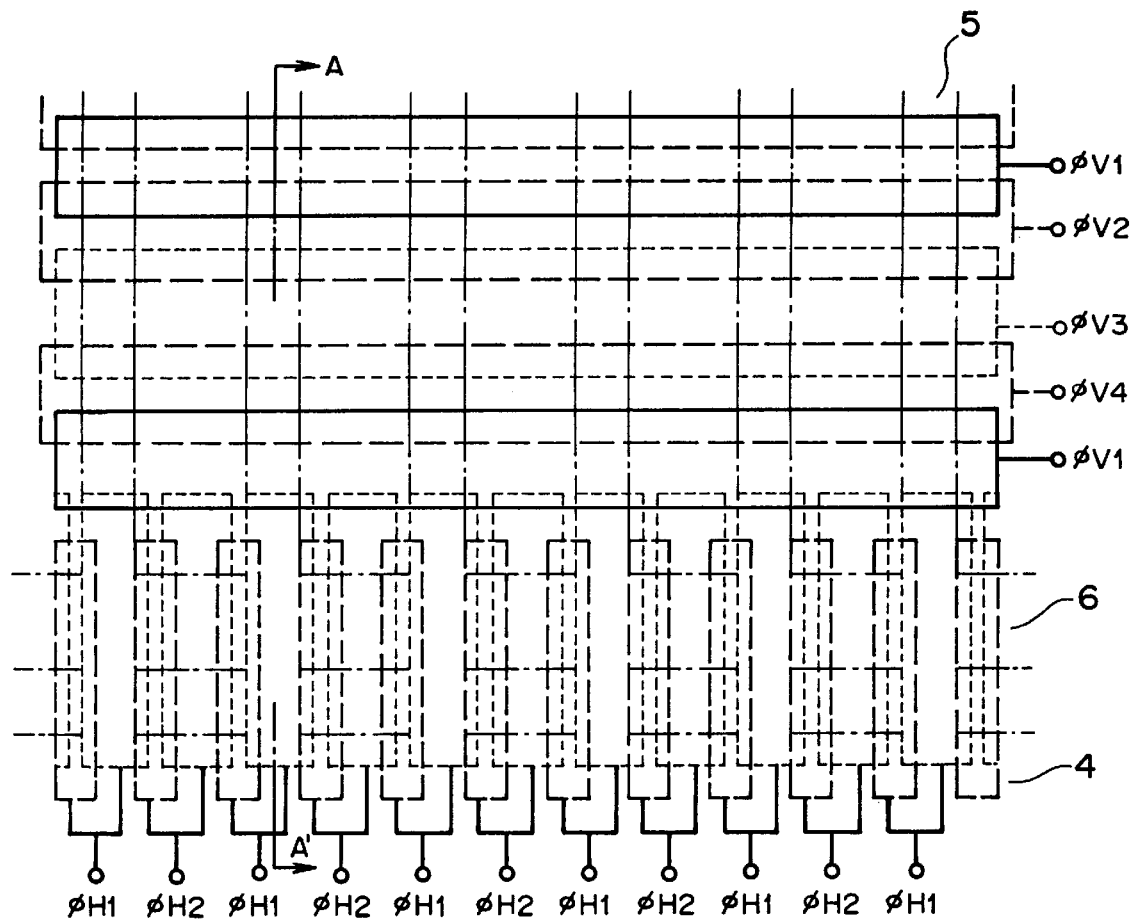
FIG. 2 is a top view showing the electrode configuration of the conventional solid state imaging device.
Figure 3:
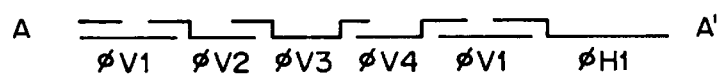
FIG. 3 is a sectional view seen along a line A-A' of FIG. 2.
Figure 4:
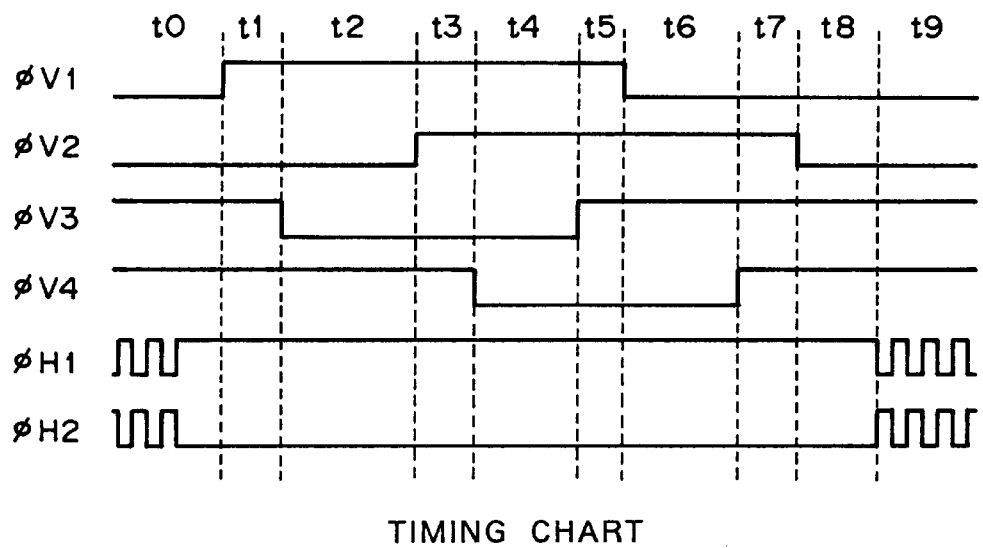
FIG. 4 is a timing diagram of drive pulses of the conventional solid state imaging device.
Figure 5:
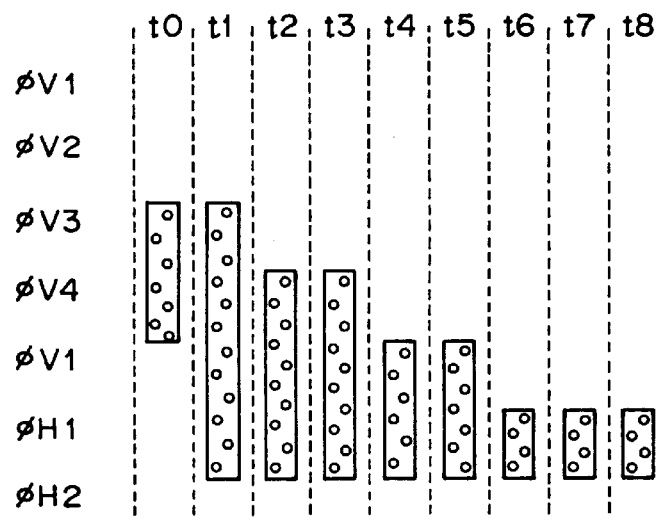
FIG. 5 is a schematic diagram showing the transfer state of signal charge from a vertical transfer register to a horizontal transfer register in the conventional solid state imaging device.
Figure 6:
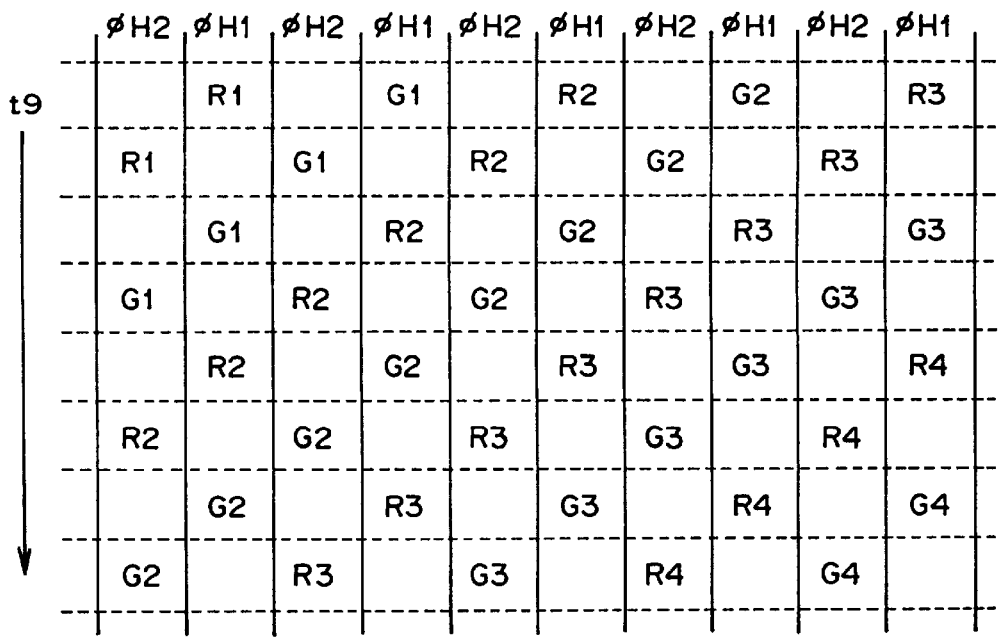
FIG. 6 is a schematic diagram showing the transfer state of signal charge in the horizontal transfer register in the conventional solid state imaging device.
Figure 7:
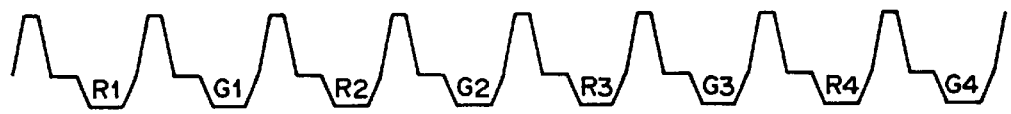
FIG. 7 is a waveform diagram of an output signal in the conventional solid state imaging device.
Figure 8:
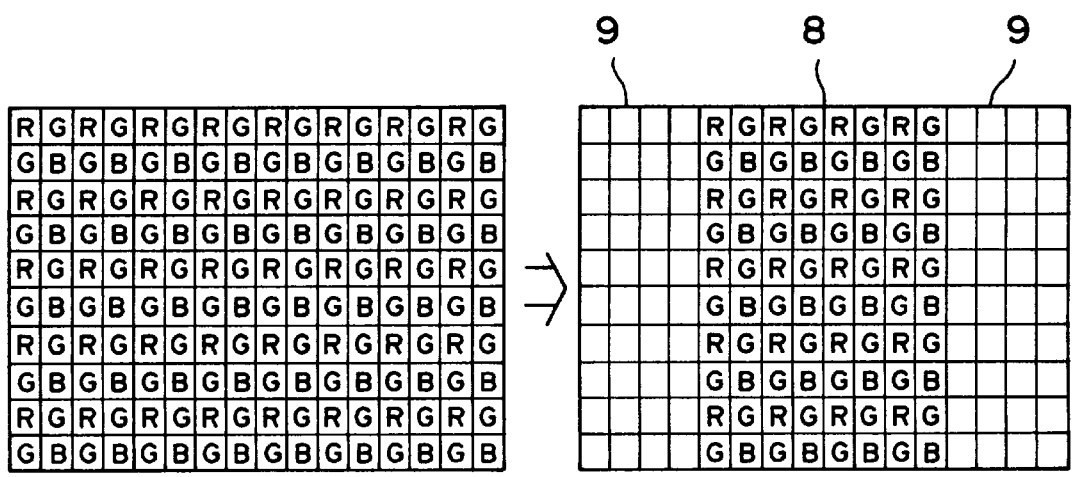
FIG. 8 is a schematic diagram illustrating resolution change-over in the conventional solid state imaging device.
Figure 9:
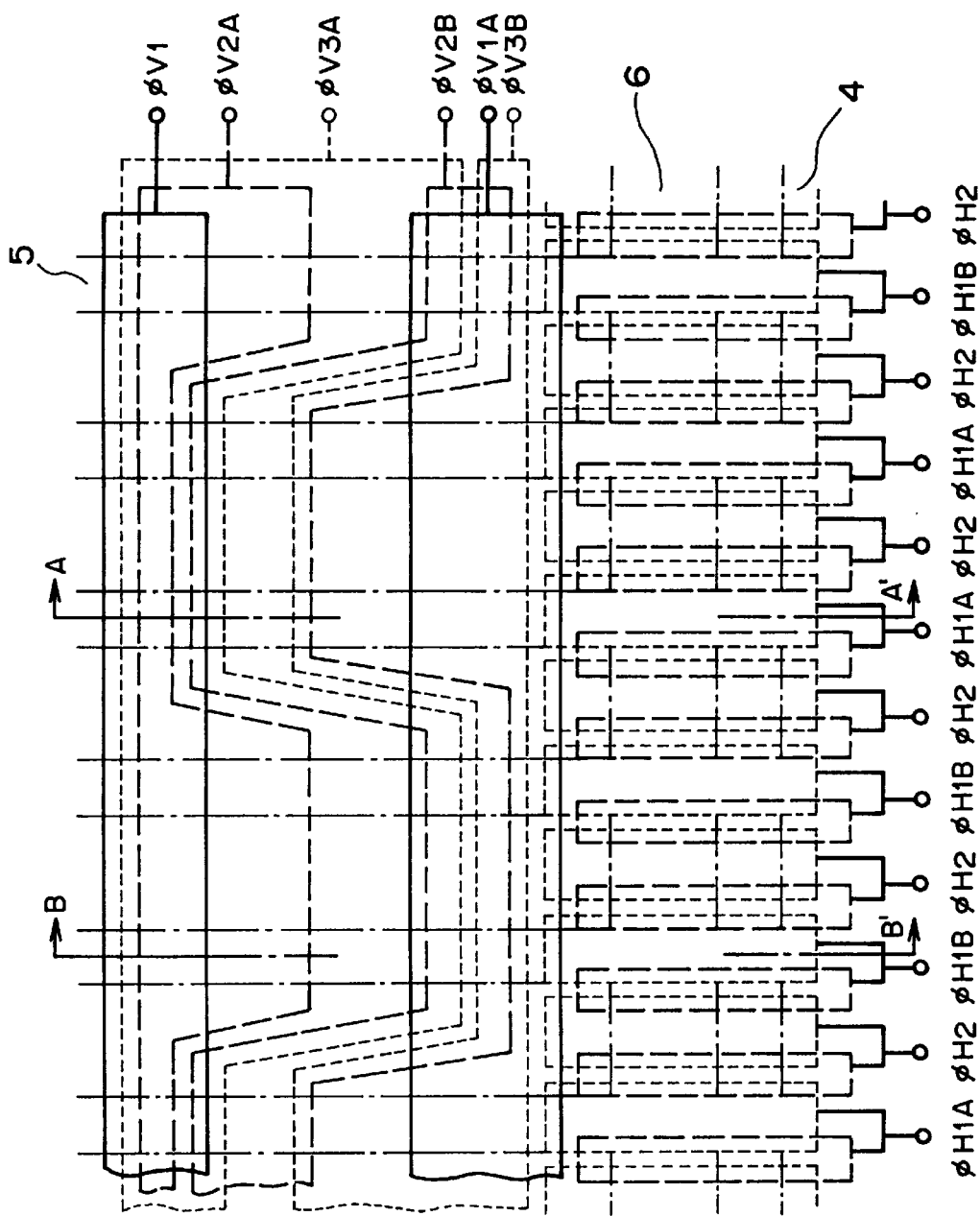
FIG. 9 is a top view showing the electrode configuration in a first embodiment of the present invention.

FIG. 9 is a top view showing an electrode configuration of a connection part between vertical transfer registers and a horizontal transfer register in a solid state imaging device of a first embodiment according to the present invention. FIGS. 10A and 10B are sectional views seen along a line A-A' and a line B-B' of FIG. 9, respectively. In the connection part of vertical transfer registers 5 with respect to the horizontal transfer register, transfer electrodes to which clocks φV1, φV2A, φV3A, φV2B, φV3B, and φV1A are applied are arranged in the cited order. Final transfer electrodes to which φV1A is applied form gates for the horizontal transfer register 6. On the upstream side of the portion of the vertical transfer registers 5 illustrated in FIG. 9, transfer electrodes to which the clocks φV1, φV2, φV3, and φV4 are applied are arranged repetitively in the cited order in the same way as the conventional device shown in FIG. 2.

In the horizontal transfer register 6, transfer is conducted by 3-phase clocks, i.e., φH1A, φH1B, and φH2. Except the former half portion in which charge transfer from the vertical transfer registers to the horizontal transfer register, φH1A and φH1B have pulses of the same phase. When φV1A and φH1A are high and φH1B and φH2 are low, the horizontal transfer register 6 receives the signal charge on the undersides of the transfer electrodes to which ØH1A is applied. When φV1A and φH1B are high and φH1B and φH2 are low, the horizontal transfer register 6 receives the signal charge on the undersides of the transfer electrodes to which φH1B is applied. At this time, φH1A may be either high or low.

As shown in FIGS. 10A and 10B, transfer electrodes to which φV1 and φV1A are applied are formed by first polysilicon layer. Transfer electrodes to which φV2A and φV2B are applied are formed by second polysilicon layer. Transfer electrodes to which φV3A and φV3B are applied are formed by third polysilicon layer.

Each of all transfer electrodes of the horizontal transfer register 6 is formed by polysilicon of the second layer and the third layer. An electrode portion of the second polysilicon layer forms a storage portion, and an electrode portion of the third polysilicon layer forms a barrier portion. The configuration itself of the transfer electrodes in the horizontal transfer register 6 is not different from that of the conventional device.

Figure 13:
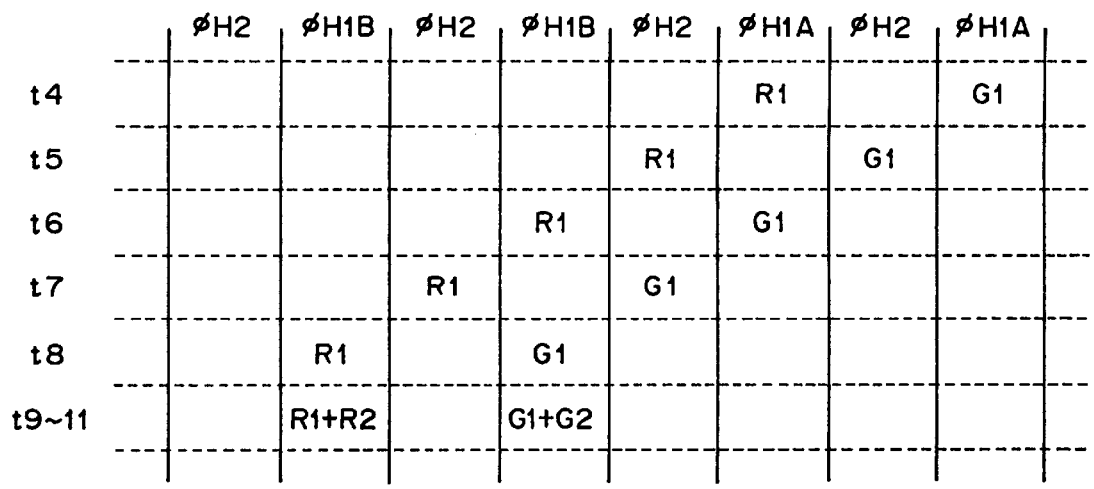
FIG. 13 is a schematic diagram showing the transfer state of signal charge in the horizontal transfer register in the first embodiment of the present invention.

Operation of the solid state imaging device according to the present invention in the connection part between the vertical transfer registers 5 and the horizontal transfer register 6 will now be described by referring to FIGS. 11 to 13. Hereafter, two channels located on the side extending along a line A-A' of FIG. 9 are referred to as A channels, and two channels located on the side extending along a line B-B' are referred to as B channels. FIG. 11 shows pulse timing of clocks φV1, φV2A, φV3A, φV2B, φV3B, and φV1A applied to the transfer electrodes of the vertical transfer registers 5, and pulse timing of clocks φH1A, φH1B, and φH2 applied to the transfer electrodes of the horizontal transfer register 6. FIG. 12 shows how signal charge in a vertical transfer register 5 is transferred to the horizontal transfer register 6. FIG. 13 shows how signal charge in the horizontal transfer register 6 is transferred.

Immediately before t0 finishes, signal charges transferred through the vertical transfer registers 5 are stored under the transfer electrodes of φV1, φV2A, φV3A, φV2B, and φV3B. When φV1 turns low during t1, the signal charges stored under the transfer electrodes of φV1 are transferred to undersides of the transfer electrodes of φV2A, φV3A, φV2B, and φV3B. In the A channels, the signal charges are stored under the transfer electrodes of φV2B and φV3B at this time. In B channels, the signal charges are stored under the transfer electrodes of φV2A and φV3A at this time. Here, signal charges stored under the transfer electrodes of φV2B and φV3B in the two A channels are referred to as R1 and G1. Signal charges stored under the transfer electrodes of φV2A and φV3A in the two B channels are referred to as R2 and G2 (see FIG. 13). During t2, the clock φV1A turns high. Subsequently, φV2B turns low. Since φH1A is at its high level and φH2 is at its low level, signal charges R1 and G1 stored under the transfer electrodes of φV2B and φV3B in the A channels begin to be transferred to undersides of the transfer electrodes of φH1A. During t3, φV3B turns low. Subsequently, during t4, φV1A turns low. As a result, the signal charges R1 and G1 in the A channels are completely transferred to the underside of the electrodes of φH1A. The signal charges R1 and G1 thus stored under the transfer electrodes of φH1A are transferred within the horizontal transfer register during t5, t6 and t7. During t8, respective signal charges arrive at the undersides of the transfer electrodes of φH1B (see FIG. 13).

Figure 14:
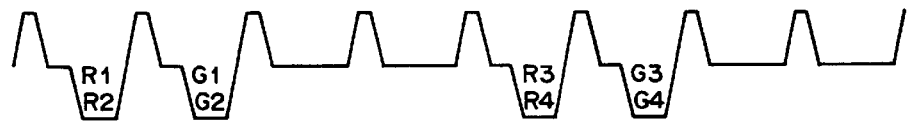
FIG. 14 is a waveform diagram of an output signal in the first embodiment of the present invention.

On the other hand, φV3A and φV3B are kept at high levels in the B channels during the interval from t1 to t8. As a result, the signal charges R2 and G2 continue to be held under the transfer electrodes of the clocks φV3A and φV3B. During t9, φV1A turns high again. When φV2A turns low, φH1B is at its high level and φH2 is at its low level. As a result, signal charges R2 and G2 stored under the transfer electrodes of φV2A and φV3A begin to be transferred to undersides of the transfer electrodes of φH1B. The clock φV3A turns low during t10 and φV1A turns low during t11. As a result, the signal charges are completely transferred to the undersides of the transfer electrodes of φH1B. At this time, there are the signal charges R1 and G1 already stored under the transfer electrodes of φH1B. By this operation, therefore, added signals R1+R2 and G1+G2 are formed under these transfer electrodes. In this case, a signal waveform as shown in FIG. 14 is output from the output amplifier. Therefore, the number of pixels in the horizontal direction is converted to ½. As a result, the horizontal resolution is lowered to ½.

In the above described first embodiment, the pulse amplitude of the clock φV1A is the same as that of other clock. Alternatively, the amplitude of φV1A may be made equal to ½ of the amplitude of other clocks, and the signal charges may be transferred to the horizontal transfer register via the undersides of the transfer electrodes of φV1A only when φV3B or φV3A turns low. In such a case, the clocks φH1A and φH1B can be made pulses of the same phase, and the horizontal transfer register can be made complete 2-phase clock transfer type. Furthermore, instead of applying the clock φV1A, a voltage of an intermediate potential may be always applied to the final transfer electrodes of the vertical transfer registers to which the clock φV1A has been applied.

Figure 15:
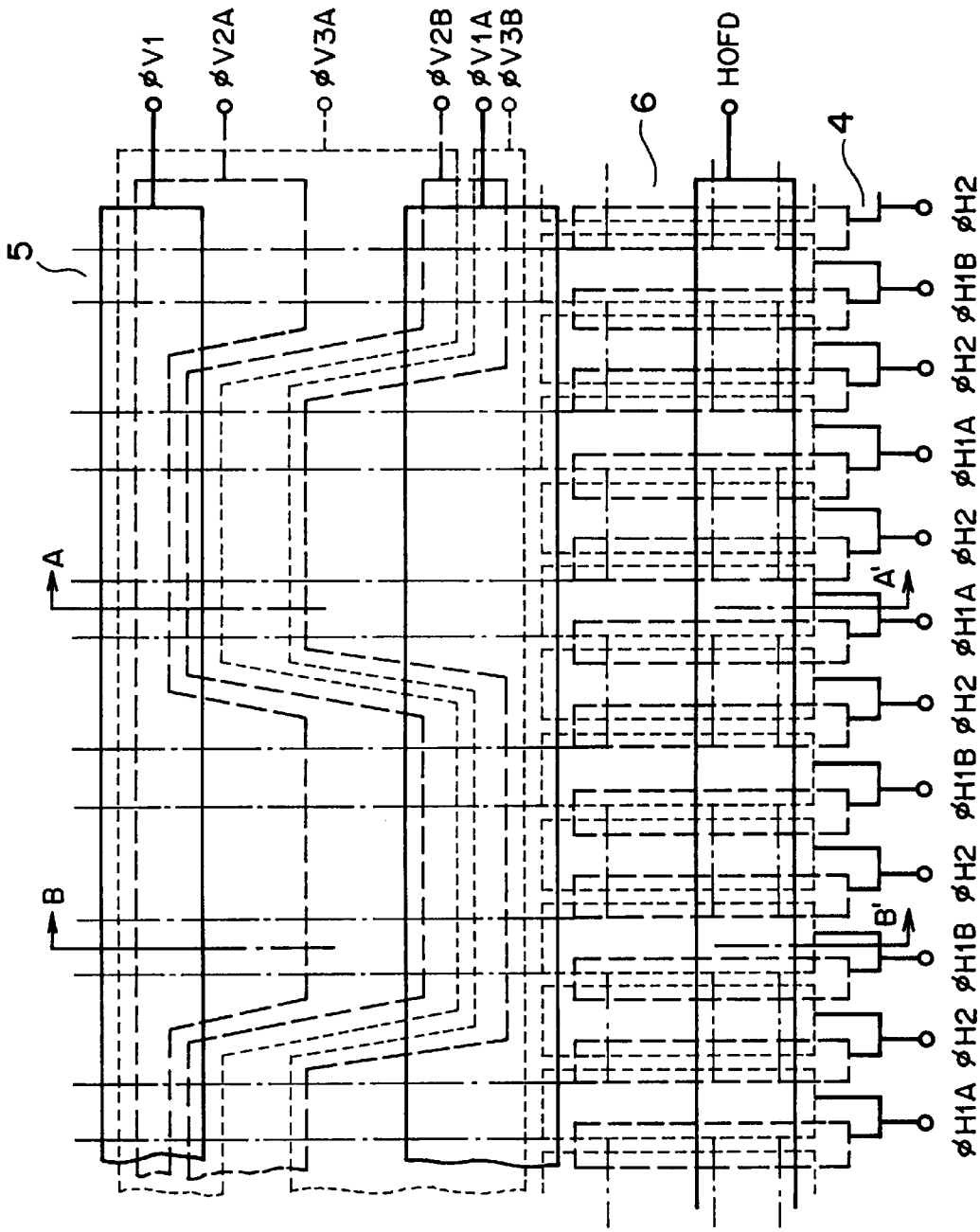
FIG. 15 is a top view showing the electrode configuration of a solid state imaging device in a second embodiment of the present invention.
Figures 16A, 16B:
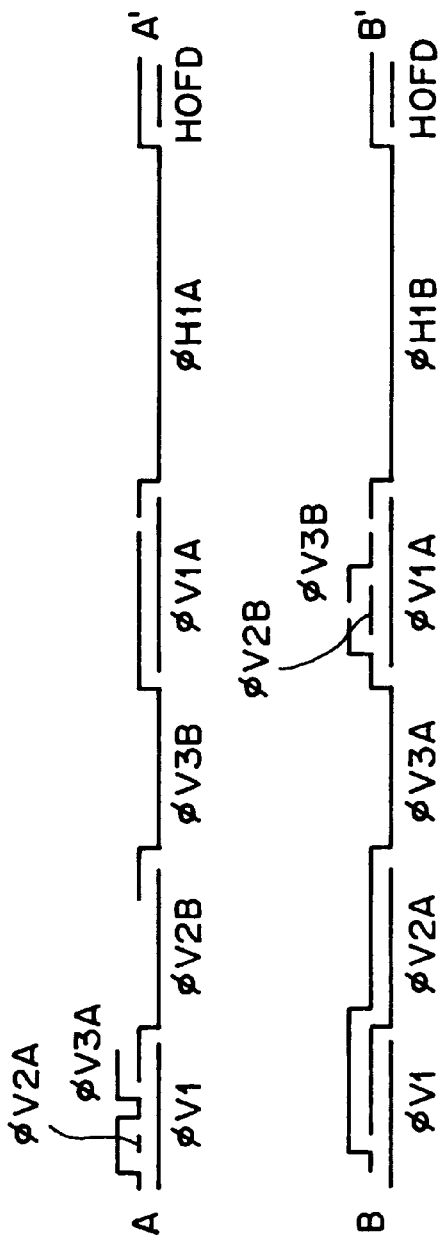
FIG. 16A is a sectional view seen along a line A-A' of FIG. 15.
FIG. 16B is a sectional view seen along a line B-B' of FIG. 15.

FIG. 15 is a top view showing an electrode configuration of a connection part between vertical transfer registers and a horizontal transfer register in a solid state imaging device of a second embodiment according to the present invention. FIGS. 16A and 16B are sectional views seen along a line A-A' and a line B-B' of FIG. 15, respectively. In the present embodiment, the vertical transfer registers and the horizontal transfer register themselves in the connection part have a configuration similar to that of the preceding embodiment shown in FIGS. 9, 10A and 10B. The present embodiment differs from the preceding embodiment in that an overflow drain gate (hereafter abbreviated to HOFD) is provided in a portion of the horizontal transfer register 6 illustrated in a lower part thereof in FIG. 15. By activating the overflow drain gate, the signal charges in the horizontal transfer register can be transferred to a horizontal surplus charge sweeping out drain 4 provided so as to be adjacent to the horizontal transfer register 6.

Figure 17:
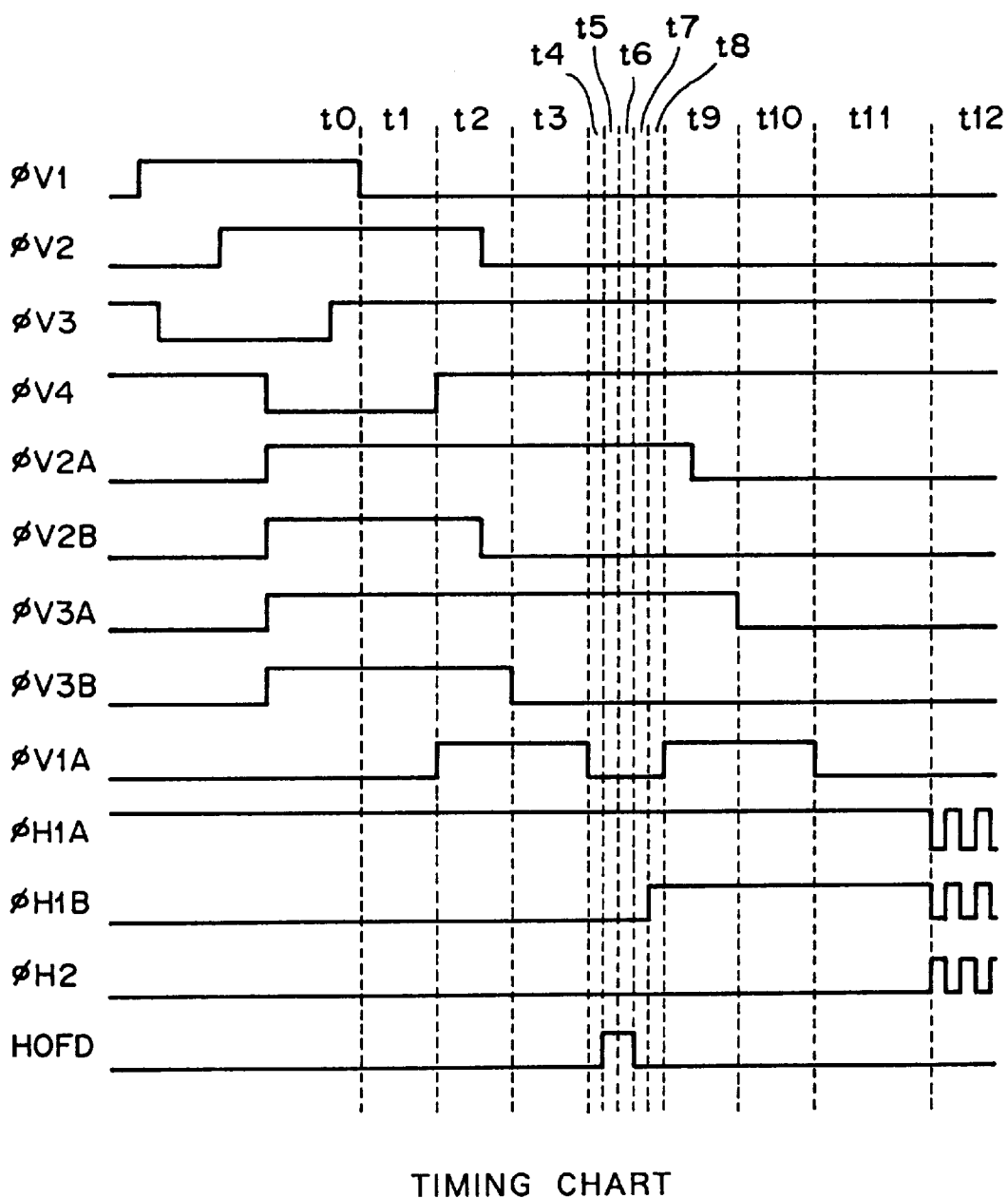
FIG. 17 is a timing diagram of drive pulses in the second embodiment of the present invention.
Figure 18:
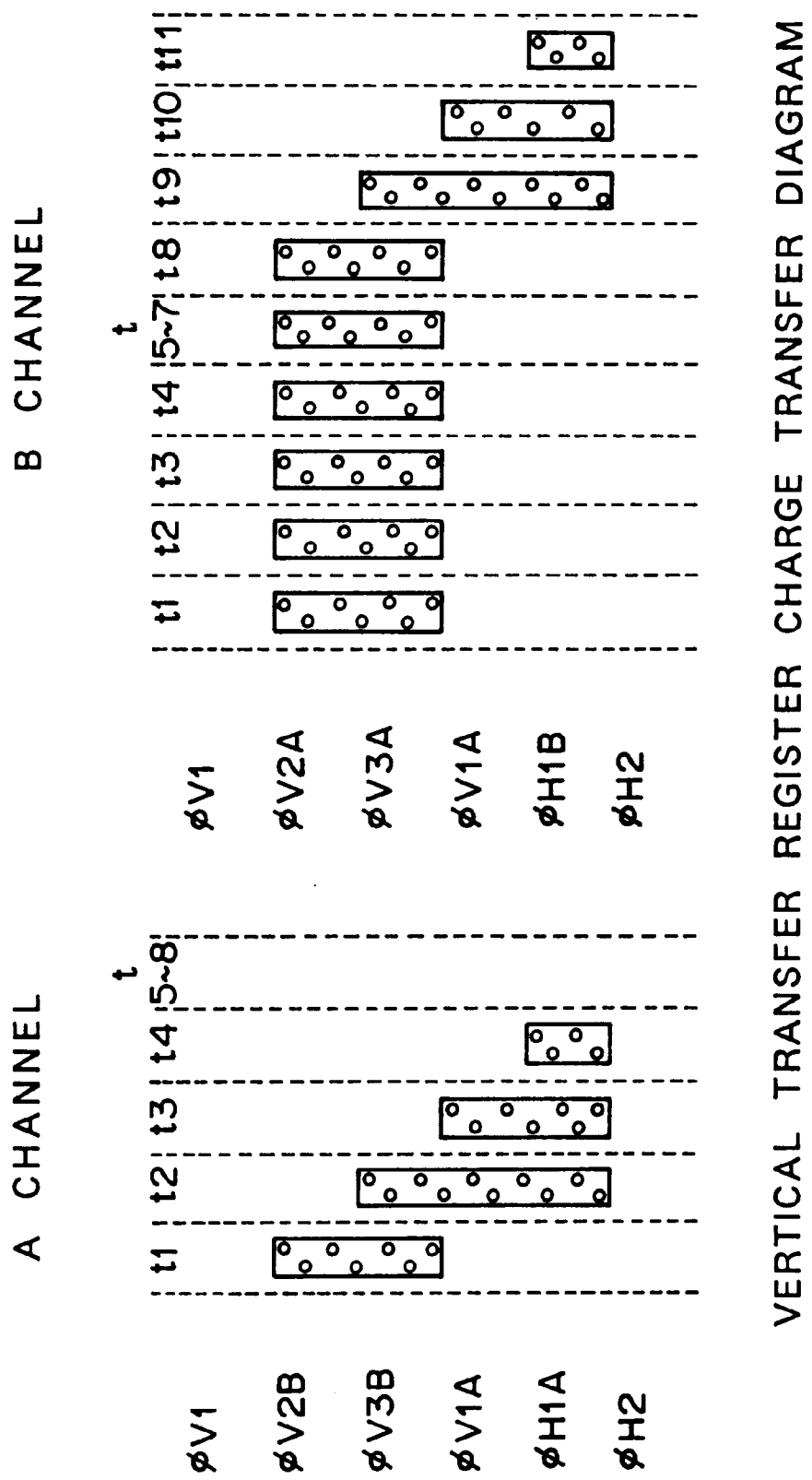
FIG. 18 is a schematic diagram showing the transfer state of signal charge from a vertical transfer register to a horizontal transfer register in the second embodiment of the present invention.
Figure 19:
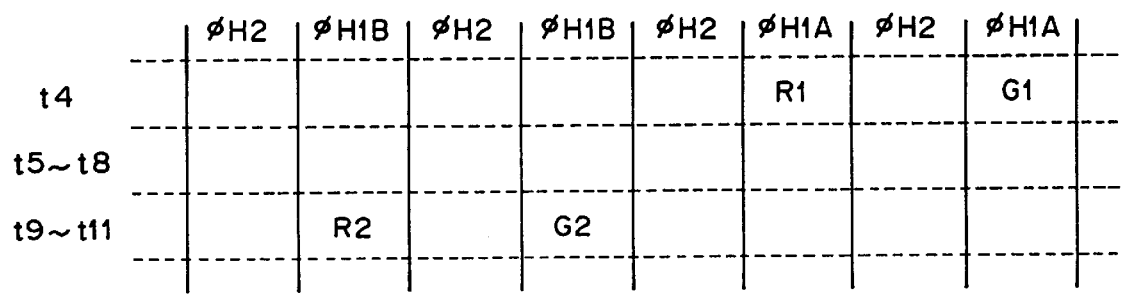
FIG. 19 is a schematic diagram showing the transfer state of signal charge in the horizontal transfer register in the second embodiment of the present invention.

Operation of the solid state imaging device of the second embodiment will now be described by referring to FIGS. 17 to 19.

Operation of t0 to t4 is the same as that of the first embodiment. In t5 and t6, the HOFD gate is in the on-state. As a result, the signal charges R1 and G1 stored under the transfer electrodes of φH1A are swept out and thrown away to the horizontal surplus charge sweeping out drain 4. During t8, φH1B turns high. During t9, φV1A turns high. Subsequently, φV2A turns low. Since φH2 is at its low level, the signal charges R2 and G2 stored under the transfer electrodes of φV2A and φV3A begin to be transferred to the undersides of the transfer electrodes of φH1B. During t10, φV3A turns low. Subsequently, during t11, φV1A turns low. As a result, the signal charges are completely transferred to the undersides of the transfer electrodes of φH1B. In this way, R1 and G1 among four consecutive pixel signals R1, G1, R2 and G2 are swept and thrown away. Under the transfer electrodes of φH1B, only R2 and G2 are stored.

Figure 20:
FIG. 20 is a waveform diagram of an output signal in the second embodiment of the present invention.

In this case, a signal waveform as shown in FIG. 20 is output from the output amplifier. In other words, the number of pixels in the horizontal direction is converted to ½. Without driving the horizontal transfer register at high speed, therefore, the horizontal resolution can be lowered to ½.

The embodiments have been described assuming that the color filter is arranged in the Bayer form. However, the present invention is not restricted to this arrangement, but a color filter having an arbitrary arrangement can be adopted. Furthermore, in the embodiments heretofore described, two pixels among four pixels consecutive in the horizontal direction are transferred to the horizontal transfer register in advance. In the present invention, however, these numbers of pixels are not limited to the above described values, but are suitably determined according to the whether a color filter is present or not, the configuration of the color filter, and desired degree of lowering in resolution.

What is claimed is:

1. A solid state imaging device comprising:
    a plurality of photodiodes arranged in a matrix form;
    first kind of vertical transfer registers and second kind of vertical transfer registers disposed alternately so as to be adjacent to said plurality of photodiodes;
    a horizontal transfer register for transferring signal charges transferred from said vertical transfer registers to an output amplifier; and
    a first transfer electrode of first layer, a first transfer electrode of second layer, a first transfer electrode of third layer, a second transfer electrode of first layer, a second transfer electrode of second layer, and a second transfer electrode of third layer disposed in a connection part of said vertical transfer registers with respect to said horizontal transfer register,
    wherein said transfer electrodes are disposed in order, facing said horizontal transfer register, of the first transfer electrode of first layer, the first transfer electrode of second layer, the first transfer electrode of third layer, the second transfer electrode of second layer, the second transfer electrode of third layer, and the second transfer electrode of first layer, and
    wherein the first transfer electrode of second layer and the first transfer electrode of third layer are disposed, in said first kind of vertical transfer registers, on transfer electrodes of layers lower than itself, and the second transfer electrode of second layer and the second transfer electrode of third layer are disposed, in said second kind of vertical transfer registers, on transfer electrodes of layers lower than itself.

2. A solid state imaging device according to claim 1, wherein among 2n vertical transfer registers (where n is a positive integer) consecutively disposed, n consecutive vertical transfer registers located on said output amplifier side are used as the vertical transfer registers of the second kind, and remaining vertical transfer registers are used as vertical transfer registers of the first kind.

3. A solid state imaging device according to claim 1 or 2, wherein said horizontal transfer register has, in each transfer stage, a storage portion and a barrier portion, and said horizontal transfer register is a register of basically 2-phase clock transfer type.

4. A solid state imaging device according to claim 1, wherein clock pulses differing in phase are applied to said first transfer electrode of first layer, said first transfer electrode of second layer, said first transfer electrode of third layer, said second transfer electrode of second layer, said second transfer electrode of third layer, and said second transfer electrode of first layer.

5. A solid state imaging device according to claim 1, wherein on a side of said horizontal transfer register opposite to a side connected to the vertical transfer registers, a surplus charge sweeping out drain is provided via an overflow drain gate.

6. A method for driving a solid state imaging device including a plurality of photodiodes arranged in a matrix form, first kind of vertical transfer registers and second kind of vertical transfer registers disposed so as to be adjacent to said plurality of photodiodes, and a horizontal transfer register for transferring signal charges transferred from said vertical transfer registers to an output amplifier,
    said method comprising the step of transferring the signal charges of said vertical transfer registers to said horizontal transfer register:
    said step of transferring the signal charges having steps of
    transferring the signal charges of the first kind of vertical transfer registers to the horizontal transfer register in such a state as to pin the signal charges of the second kind of vertical transfer registers; and thereafter
    transferring only the signal charges of the second kind of vertical transfer registers to the horizontal transfer register.

7. A method for driving a solid state imaging device according to claim 6, comprising the steps of:
    transferring only the signal charges of the first kind of vertical transfer registers to the horizontal transfer register;
    then transferring the signal charges to undersides of transfer electrodes receiving the signal charges of the second kind of vertical transfer registers; and
    then transferring the signal charges of the second kind of vertical transfer registers to the horizontal transfer register to mix both signal charges.

8. A method for driving a solid state imaging device according to claim 6, wherein said horizontal transfer register is driven basically by 2-phase clocks, however, a transfer stage of said horizontal transfer register receiving transfer of the signal charges of said second kind of vertical transfer register is kept at a low level when transferring the signal charges of said first kind of vertical transfer register to said horizontal transfer register.

* * * * *